(12) United States Patent
Deese et al.

(10) Patent No.: US 9,504,131 B1
(45) Date of Patent: Nov. 22, 2016

(54) LIGHTING FIXTURE SENSOR NETWORK

(71) Applicant: Cree, Inc., Durham, NC (US)

(72) Inventors: Matthew Deese, Raleigh, NC (US); James McBryde, Raleigh, NC (US); Bill Dungan, Cary, NC (US); John J. Trainor, Durham, NC (US); Rob Bowser, Cary, NC (US); Nathan R. Snell, Raleigh, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/826,892

(22) Filed: Aug. 14, 2015

(51) Int. Cl.
*H05B 37/02* (2006.01)
*H05B 33/08* (2006.01)

(52) U.S. Cl.
CPC ...... *H05B 37/0227* (2013.01); *H05B 33/0854* (2013.01); *H05B 33/0872* (2013.01); *H05B 37/0254* (2013.01)

(58) Field of Classification Search
CPC .......... H05B 37/0227; H05B 33/0854; H05B 33/0872; H05B 37/0254
USPC ........................................................ 315/134
See application file for complete search history.

(56) References Cited

U.S. PATENT DOCUMENTS

| | | | |
|---|---|---|---|
| 8,994,276 B2 * | 3/2015 | Recker | H02J 9/02 315/160 |
| 2014/0265920 A1 * | 9/2014 | Pederson | H05B 33/0842 315/294 |
| 2015/0015145 A1 * | 1/2015 | Carrigan | H05B 37/0272 315/131 |
| 2015/0042240 A1 * | 2/2015 | Aggarwal | H04L 12/2803 315/292 |
| 2015/0351169 A1 * | 12/2015 | Pope | H05B 33/086 315/193 |
| 2016/0095189 A1 * | 3/2016 | Vangeel | F24F 11/006 315/152 |
| 2016/0165679 A1 * | 6/2016 | Laherty | H05B 33/086 315/294 |

* cited by examiner

*Primary Examiner* — Dylan White
(74) *Attorney, Agent, or Firm* — Withrow & Terranova, P.L.L.C.

(57) ABSTRACT

A lighting fixture includes a light source, a housing coupled to the light source, communications circuitry, sensor circuitry, and control circuitry. The housing includes an opening through which light from the light source is provided. The control circuitry includes a memory storing instructions, which, when executed by the control circuitry cause the lighting fixture to transmit sensor data obtained from the sensor circuitry via the communications circuitry for persistent storage of the sensor data. By transmitting sensor data from the lighting fixture for persistent storage thereof, the sensor data may be used to characterize a space in which the lighting fixture is located.

25 Claims, 20 Drawing Sheets

LIGHTING FIXTURE SENSOR NETWORK

FIELD OF THE DISCLOSURE

The present disclosure relates to lighting fixtures and systems.

BACKGROUND

Modern lighting fixtures continue to evolve, incorporating features such as controllers, sensors, remote modules, and the like. These controllers, sensors, and remote modules may allow a lighting fixture to implement lighting programs, respond to the surrounding environment, and be controlled, for example, over a local area network and/or the Internet. One or more sensors may be incorporated into a lighting fixture in order to provide information to the lighting fixture about the surrounding environment. For example, a lighting fixture may include an ambient light sensor to gather information about the ambient light level in the area around the lighting fixture. Additionally, a lighting fixture may include an occupancy sensor to detect when an individual is located near the lighting fixture.

Due to the fact that conventional lighting fixtures are generally only concerned with measuring environmental factors directly related to light output such as ambient light and occupancy, conventional lighting fixtures utilize few, if any, sensors. Further, the measurements obtained from the small number of sensors that are used are generally utilized only within the conventional lighting fixture itself, for example, to control a brightness of light provided by the lighting fixture and/or to determine when to turn ON and OFF. The functionality of conventional lighting fixtures may therefore be limited.

Accordingly, there is a need for improved lighting fixtures and systems.

SUMMARY

The present disclosure relates to lighting fixtures and systems. In one embodiment, a lighting fixture includes a light source, a housing coupled to the light source, communications circuitry, sensor circuitry, and control circuitry. The housing includes an opening through which light from the light source is provided. The control circuitry includes a memory storing instructions, which, when executed by the control circuitry cause the lighting fixture to transmit sensor data obtained from the sensor circuitry via the communications circuitry for persistent storage of the sensor data. By transmitting sensor data from the lighting fixture for persistent storage thereof, the sensor data may be used to characterize a space in which the lighting fixture is located.

In one embodiment, a lighting management system includes communications circuitry, processing circuitry, and a memory. The memory stores instructions, which, when executed by the processing circuitry cause the lighting management system to persistently store sensor data obtained from sensor circuitry on each one of a number of lighting fixtures. By persistently storing the sensor data, valuable insights may be determined about a space in which the lighting fixtures are located.

In one embodiment, the memory stores further instructions, which, when executed by the processing circuitry cause the lighting management system to provide the stored sensor data via the communications circuitry upon a request for the stored sensor data. Such a request may be, for example, a hypertext transfer protocol (HTTP) request. Accordingly, the lighting management system may provide an interface to the sensor data of a lighting system.

In one embodiment, the lighting management system is configured to analyze the stored sensor data. For example, the lighting management system may analyze the sensor data in order to provide one or more suggested settings for at least one lighting fixture. The lighting management system may facilitate the display of a user interface showing the one or more suggested settings and providing a means to implement the one or more suggested settings.

In one embodiment, the memory stores further instructions, which, when executed by the processing circuitry cause the lighting management system to provide a user interface showing a spatial representation of the stored sensor data wherein the sensor data from each lighting fixture is displayed within a location on a display that is indicative of the location of the lighting fixture from which it was obtained. Accordingly, the sensor data may be intuitively displayed for easy viewing.

In one embodiment, a lighting fixture includes a light source, a housing coupled to the light source, communications circuitry, and control circuitry. The housing includes an opening through which light from the light source is provided. The control circuitry includes a memory storing instructions, which, when executed by the control circuitry cause the lighting fixture to adjust one or more light output parameters of the light source, and store fixture location information describing a location of the lighting fixture in response to receipt of the fixture location information from the communications circuitry. By storing fixture location information describing the location of the lighting fixture, the location of the lighting fixture may be used to send messages to lighting fixtures in the same location and/or retrieve data from lighting fixtures in the same location, which may be beneficial in many circumstances.

In one embodiment, the light output parameters include a light intensity, a color, and a color temperature.

In one embodiment, the memory stores further instructions, which, when executed by the control circuitry cause the lighting fixture to provide the fixture location information in response to a request for the fixture location information received by the communications circuitry.

In one embodiment, the memory stores further instructions, which, when executed by the control circuitry cause the lighting fixture to receive a message via the communications circuitry, the message including instructions and recipient location information indicating one or more locations intended to receive the instructions, determine if the recipient location information includes the fixture location information, and, if the recipient location information includes the fixture location information, processing the message. Accordingly, the fixture location information may be used to send messages to particular lighting fixtures within a lighting system.

In one embodiment, a lighting management system includes communications circuitry, processing circuitry, and a memory. The memory stores instructions, which, when executed by the processing circuitry cause the lighting management system to receive user input indicating fixture location information describing a location of a lighting fixture, and associate the lighting fixture with the fixture location information. By associating the lighting fixture with the fixture location information, the location of the lighting fixture may be used by the lighting management system to perform one or more tasks, such as providing messages to a number of lighting fixtures in a particular location or obtaining data from lighting fixtures within a particular location.

In one embodiment, the memory stores further instructions, which, when executed by the processing circuitry cause the lighting management system to provide the fixture location information to the lighting fixture via the communications circuitry.

In one embodiment, the memory stores further instructions, which, when executed by the processing circuitry cause the lighting management system to receive user input including instructions and recipient location information indicating one or more locations intended to receive the instructions, and provide a message via the communications circuitry, the message including the instructions and the recipient location information.

In one embodiment, the memory stores further instructions, which, when executed by the processing circuitry cause the lighting management system to instruct a display to provide a user interface showing a spatial representation of the lighting fixture wherein the lighting fixture is displayed on a location on the display that is indicative of the location of the lighting fixture.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
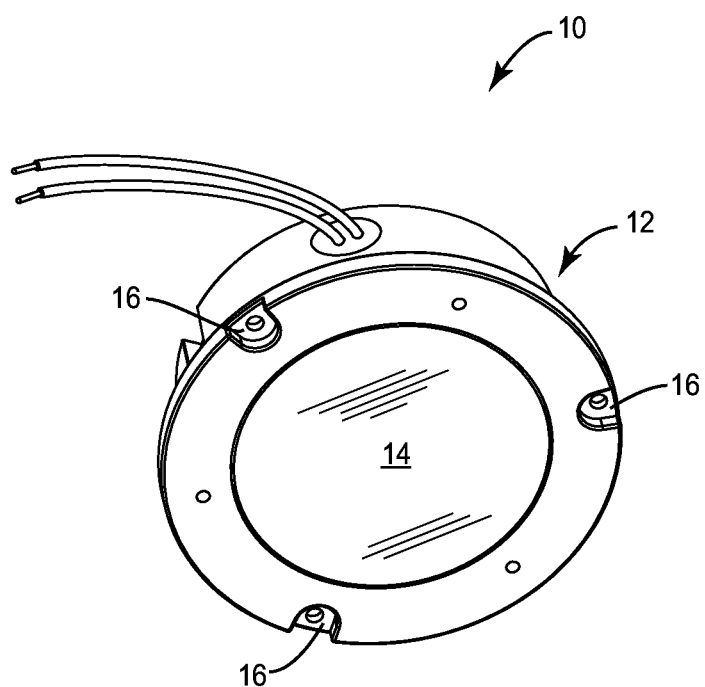
FIG. 1 illustrates a lighting fixture according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present disclosure relates to lighting systems and methods of operating the same. In one embodiment, a lighting system includes a number of lighting fixtures and a lighting management system. Each one of the lighting fixtures may include sensor circuitry, which may in turn include any number of different sensors. The lighting fixtures may provide sensor data from the sensor circuitry to the lighting management system, either periodically or in response to a request for the sensor data. In response, the lighting management system may persistently store the sensor data. Persistently storing the sensor data from the lighting fixtures may allow the lighting management system to provide the sensor data to a remote device, such as a computer, in response to a request for the sensor data. In some embodiments, the lighting management system may be connected to the Internet in order to provide the sensor data, for example, in response to a hypertext transport protocol (HTTP) request. In other embodiments, the lighting management system may be connected to a local area network (LAN) to provide the sensor data locally. The remote device may then analyze the sensor data, which may provide valuable information about the space in which the lighting system is deployed. In other embodiments, the lighting management system may itself analyze the data in order to characterize the space in which the lighting system is deployed and instruct a display to provide a user interface showing information about the space. Further, the remote device or the lighting management system may analyze the sensor data in order to provide one or more suggested settings for the lighting fixtures in the lighting system and provide a user interface to facilitate the implementation of the suggested settings. In other embodiments, the lighting fixtures themselves may persistently store sensor data from the sensor circuitry therein. In such embodiments, the lighting fixtures may be configured to provide the stored sensor data upon a request, for example, from the lighting management system. Further, the lighting management system may be configured to receive a request for the sensor data from a remote device, retrieve the sensor data from the lighting fixtures, and provide the sensor data to the remote device.

Each one of the lighting fixtures in the lighting system may be associated with fixture location information, which describes a location of the lighting fixture. The fixture location information may be nested, such that the fixture location information describes the location of the lighting fixture in several different levels of granularity. For example, the fixture location information may describe the location of the lighting fixture in terms of a building, a floor, and a room (e.g., "Building 1>Floor 2>Conference Room A"). In some embodiments, the fixture location information may be a human readable text string such that the location of the lighting fixture is apparent upon reading the text string. The fixture location information may be provided via the lighting management system, which may receive user input directly or receive user input from a remote device, such as a computer, which includes the fixture location information. Alternatively, the fixture location information may be pre-programmed into each one of the lighting fixtures during a manufacturing and/or initial setup process. In one embodiment, the fixture location information is provided to each one of the lighting fixtures via a commissioning tool. The fixture location information may be saved by the commissioning tool, the lighting management system, or any other remote device, for example, in a look-up table, or maybe stored locally in the lighting fixture itself. Alternatively, fixture location information for all of the lighting fixtures in the lighting system may be stored locally on each one of the lighting fixtures, or distributed across any number of the lighting fixtures.

The fixture location information may be used to identify the location of the lighting fixture for one or more tasks. Often, it is desirable to control lighting fixtures that are in close physical proximity, for example, in the same room, together. Accordingly, the fixture location information may be used to identify lighting fixtures that should be controlled together. Controlling one or more lighting fixtures together may include controlling one or more light output parameters of the light fixtures, such as light intensity, light color, and light color temperature. Further, the fixture location information may be used to query one or more lighting fixtures at a particular location, for example, to determine the energy consumption thereof. In various embodiments, the fixture location information may be used to request sensor data, energy consumption data, or any other operational data from a lighting fixture or lighting fixtures at a particular location.

The fixture location information may also be used to construct a spatial representation of the lighting system. In one embodiment, a map of the space in which the lighting system is located is provided, either to the lighting management system or to a remote device. The map may include a number of locations, each identified by map location information. In particular, the map may represent the space in spatial coordinates, and each one of the locations may be associated with a set of the spatial coordinates. The fixture location information may be matched with corresponding map location information in order to determine in which location the lighting fixture is located. The lighting management system and/or the remote device may then facilitate the presentation of a user interface displaying the map and each one of the lighting fixtures in the corresponding location. Specifically, a representation of the lighting fixture (e.g., an icon) may be displayed within the set of spatial coordinates associated with the location. Such a process may allow for the construction of a spatial representation of the lighting system with minimal user input.

As discussed above, the spatial representation of the lighting system may be displayed in a user interface, which may intuitively allow for the viewing and/or control of the lighting fixtures. In one embodiment, selecting a lighting fixture or lighting fixtures in the user interface allows a user to control one or more operational parameters thereof, such as an energy consumption operational parameter, one or more light output operational parameters, a control group operational parameter, an occupancy group operational parameter, or the like. Further, selecting a lighting fixture or lighting fixtures in the user interface may allow a user to view one or more current operational parameters of the lighting fixture. In one embodiment, the spatial representation includes sensor data from each one of the lighting fixtures. Accordingly, a visual representation of the sensor data within the space can be displayed. In one embodiment, the lighting management system and/or the remote device may facilitate the presentation of a user interface showing the map of the space with sensor data overlaid thereon (e.g., in the form of a "heat map"). The sensor data may be occupancy sensor data, ambient light sensor data, imaging sensor data, temperature data, humidity data, sound data, accelerometer data, energy consumption data, or the like. Viewing the sensor data overlaid on the map may allow for an intuitive characterization of the space.

In one embodiment, one or more areas of interest are identified in the map, for example, via user input to the lighting management system or the remote device. Each of the one or more areas of interest may correspond with a set of the spatial coordinates. The sensor data may then be analyzed to determine, for example, consumer interest in a particular area of interest. For example, occupancy sensor data, imaging sensor data, and sound sensor data may be analyzed to determine the amount of traffic within an area of interest. In one embodiment, each of the one or more areas of interest corresponds to a retail display, and analyzing the sensor data therein may therefore be helpful in determining the commercial viability of said display. In another embodiment, occupancy sensor data, imaging sensor data, and sound sensor data may be analyzed to locate one or more customers in need of assistance within a retail space. Employees, which may be identified, for example, by a particular color of clothing, may be filtered out from the sensor data in order to improve the accuracy of the customer location.

FIG. 1 shows a lighting fixture 10 according to one embodiment of the present disclosure. The lighting fixture 10 includes a housing 12, which supports a light source (not shown) from which light is provided. A lens 14 covers the light source and may filter light emanating therefrom. An electronics module (not shown) may be located within the housing 12, and may include various circuitry, which will be described in detail below, configured to control one or more light output parameters of the light source and perform one or more additional functions. For example, the electronics module may include driver circuitry configured to provide a desired amount of current to one or more light emitting diodes (LEDs) in the light source in order to deliver a desired light intensity, light color, light color temperature, or the like. A reflector (not shown) may be attached to the housing 12, for example, via one or more mounting holes 16, which may extend the housing 12 such that the lighting fixture 10 may be used as a recessed lighting fixture for hanging in an opening in a ceiling.

Figure 2:
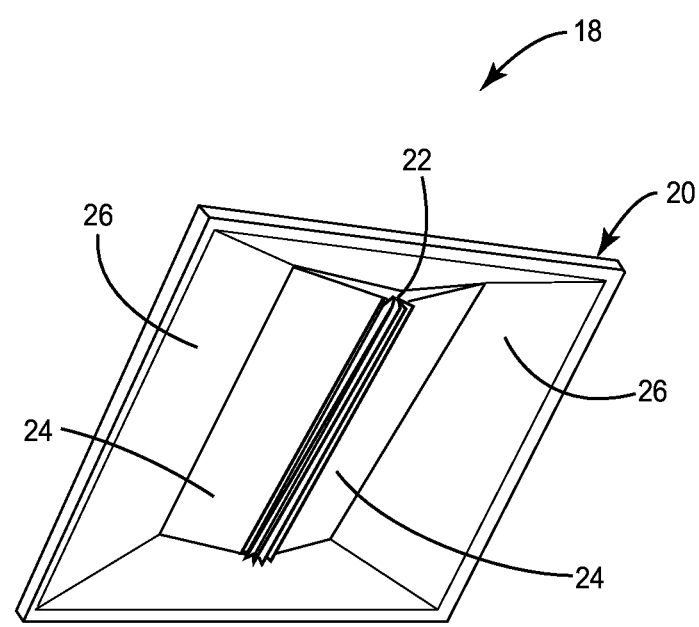
FIG. 2 illustrates a lighting fixture according to an additional embodiment of the present disclosure.

FIG. 2 shows a lighting fixture 18 according to an additional embodiment of the present disclosure. The lighting fixture 18 is substantially similar to that shown in FIG. 1, except that the lighting fixture 18 is a troffer-type fixture. The lighting fixture 18 includes a housing 20, which supports a light source (not shown) from which light is provided. A heat sink 22 may be coupled to the light source in order to divert heat away from the light source. Light from the light source may be provided indirectly such that the light provided from the light source is reflected from an inside portion of the housing 20 and through a lens 24. The lens 24 may filter the light emanated from the light source. An outer surface 26 of the housing 20 may act as a reflector, directing light from the light source in a desired direction. An electronics module (not shown) may be located within the housing 20, and may include various circuitry, which will be discussed in detail below, configured to control one or more light output parameters of the light source and perform one or more additional functions.

Figure 3:
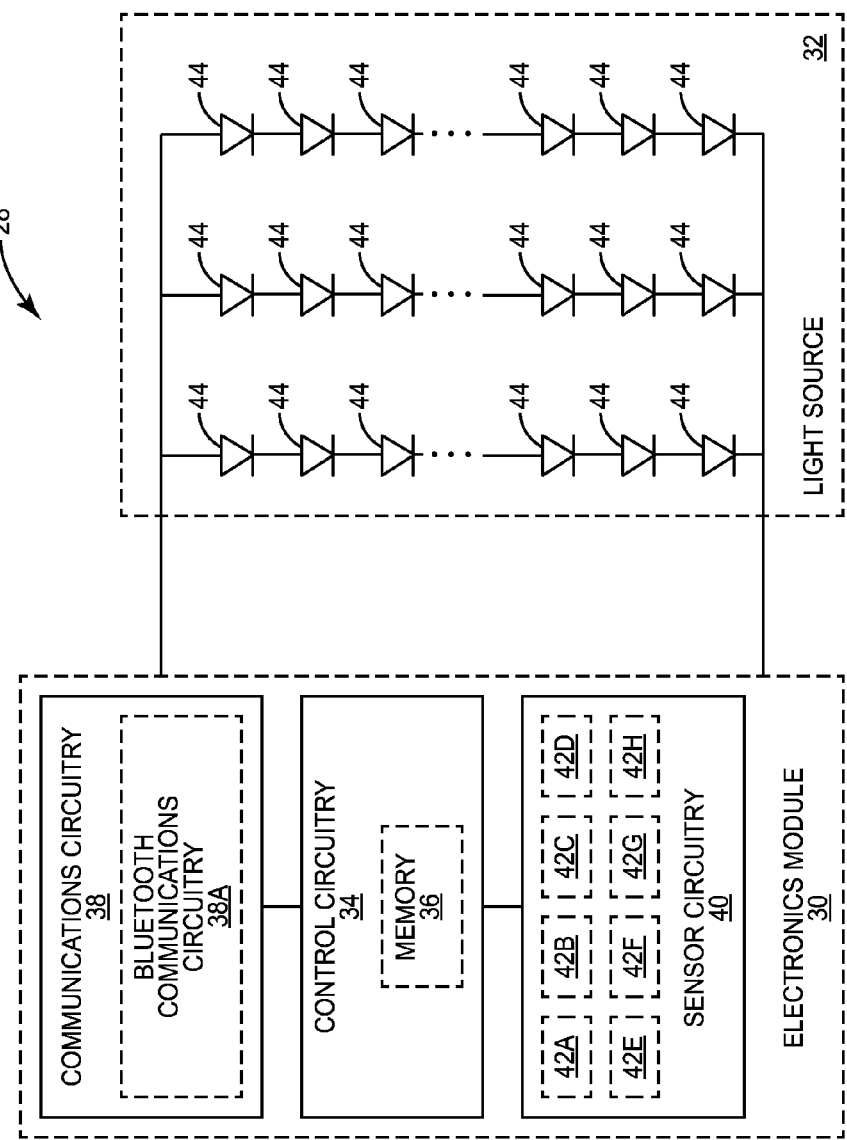
FIG. 3 illustrates a schematic representation of a lighting fixture according to one embodiment of the present disclosure.

FIG. 3 shows a schematic representation of a lighting fixture 28 according to one embodiment of the present disclosure. The lighting fixture 28 includes an electronics module 30 and a light source 32. The electronics module 30 includes control circuitry 34 (which in turn includes a memory 36), communications circuitry 38, and sensor circuitry 40. The control circuitry 34 may be the main control system for the lighting fixture 28. In some embodiments, the control circuitry 34 may be the main driver circuitry for the light source 32 such that the control circuitry 34 receives power, for example, from an AC power source, and provides a desired amount of current to the light source 32. The communications circuitry 38 is configured to communicate, either wirelessly or otherwise, with one or more additional lighting fixtures, one or more lighting management systems, and/or one or more other devices such as controls. The sensor circuitry 40 may include any number of sensors. For example, the sensor circuitry 40 may include an ambient light sensor 42A, an occupancy sensor 42B, an imaging sensor 42C (i.e., a camera), a temperature sensor 42D, a humidity sensor 42E, a sound sensor 42F (i.e., a microphone), an accelerometer 42G, an energy consumption sensor 42H, and the like.

The light source 32 may include any number of LEDs 44 arranged in any fashion. For example, the light source 32 may include three strings of series-connected LEDs coupled in parallel with one another. The LEDs in each one of the series-connected strings may each be different types of LEDs, such that each of the different types of LEDs provide light having a different light intensity, color, and/or color temperature than the other. The light output from each one of the series-connected LED strings may combine to provide light having one or more desired light output characteristics, such as light intensity, color, and/or color temperature. In one embodiment, the light source 32 includes a first series-connected LED string including a number of blue-shifted yellow (BSY) LEDs, a second series-connected LED string including a number of blue-shifted green (BSG) LEDs, and a third series-connected LED string including a number of red (R) LEDs. A number of series or parallel-connected switches may be coupled to one or more of the LEDs 44 such that the current through the one or more LEDs can be independently controlled to produce a desired light output. While primarily discussed in terms of light intensity, color, and color temperature, any number of parameters of the light output of the lighting fixtures described herein may be changed based on the principles of the present disclosure. For example, a perceived vividness, a color saturation, or any other desired light output parameters may all be controlled based on the principles described herein.

Figure 4:
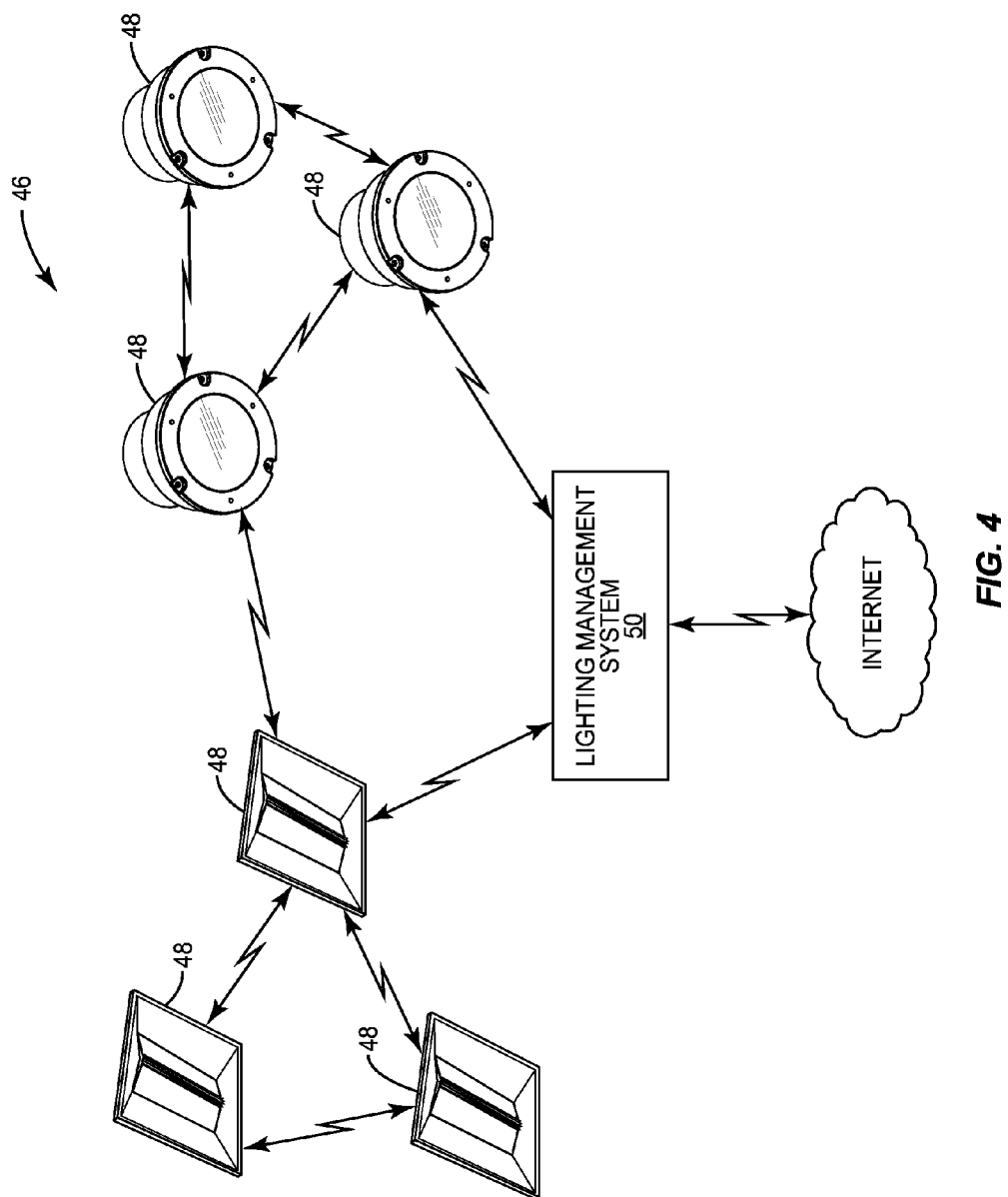
FIG. 4 illustrates a lighting system according to one embodiment of the present disclosure.

FIG. 4 shows a lighting system 46 according to one embodiment of the present disclosure. The lighting system 46 includes a number of lighting fixtures 48, which may be either the recessed-type lighting fixture described with respect to FIG. 1 or the troffer-type lighting fixture described with respect to FIG. 2. Further, the lighting system 46 includes a lighting management system 50. The lighting fixtures 48 may each be configured to communicate, wirelessly or otherwise, with one another and with the lighting management system 50. In one embodiment, the lighting fixtures 48 and the lighting management system 50 are part of a mesh wireless communications network. Accordingly, each one of the lighting fixtures 48 may only need to connect with one other lighting fixture 48 in the lighting system 46 in order to communicate with all of the devices in the lighting system 46, which may provide additional flexibility and reliability within the lighting system 46. The lighting management system 50 may be configured to communicate with the lighting fixtures 48 in order to collect data therefrom and/or provide commands thereto, as discussed in detail below. Further, the lighting management system 50 may include communications circuitry configured to connect with one or more additional devices, for example, via the Internet and/or a local area network (LAN) as shown. Accordingly, the lighting management system 50 may act as a gateway to the lighting system 46, allowing remote devices to control the lighting fixtures 48 or otherwise interface with the lighting system 46.

Figure 5:
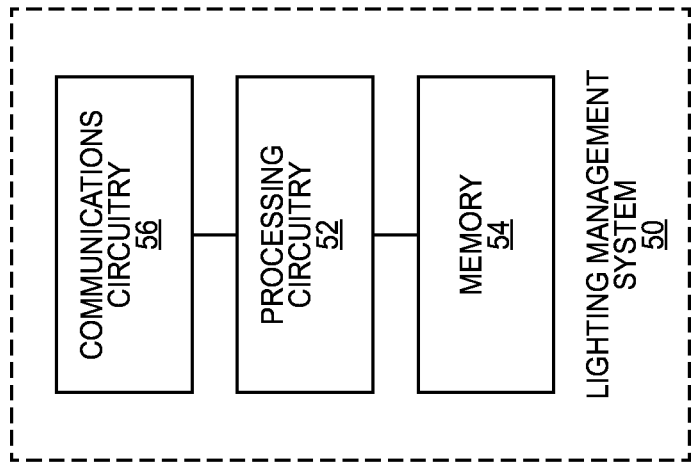
FIG. 5 illustrates a block diagram of a lighting management system according to one embodiment of the present disclosure.

FIG. 5 shows the lighting management system 50 according to one embodiment of the present disclosure. The lighting management system 50 includes processing circuitry 52, a memory 54, and communications circuitry 56. The processing circuitry 52 may be configured to execute one or more instructions stored in the memory 54 in order to provide certain functionality of the lighting management system 50 as discussed in detail below. The communications circuitry 56 may allow the lighting management system 50 to communicate, either wirelessly or otherwise, with lighting fixtures 48 in the lighting system 46 or to one or more additional devices, for example, via the Internet and/or a local area network (LAN).

Figure 6:
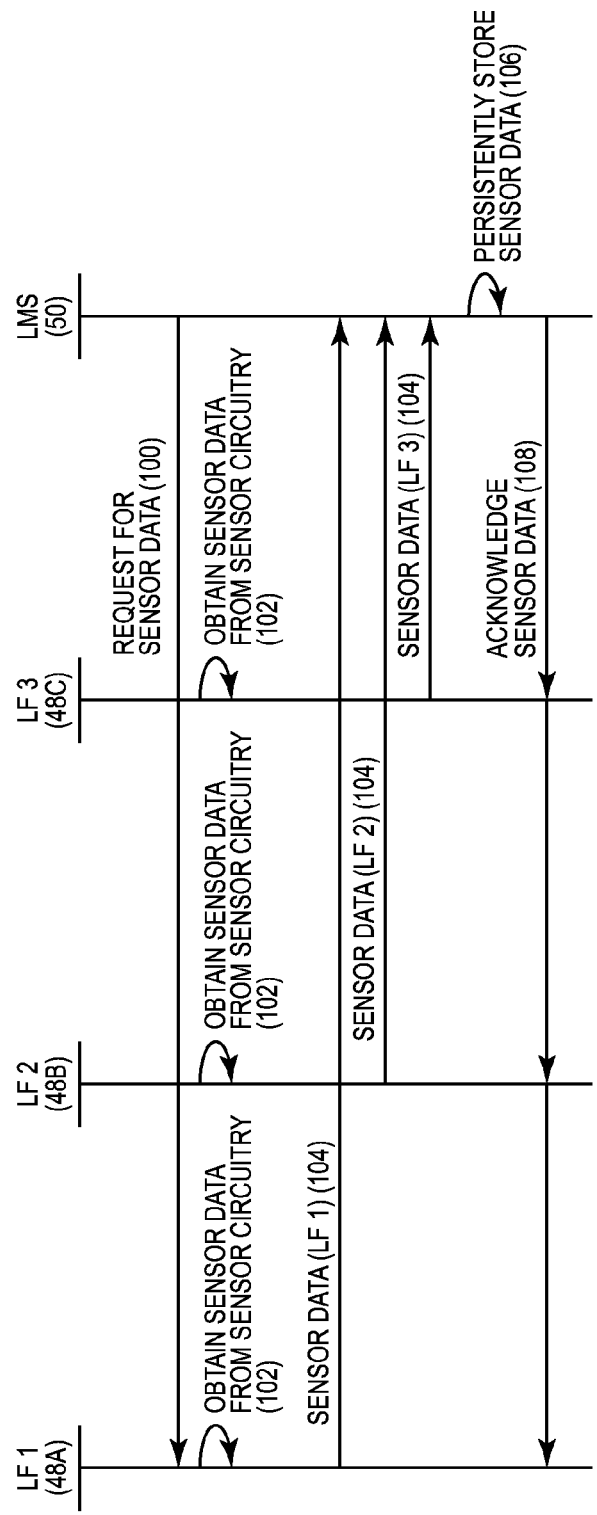
FIG. 6 is a diagram illustrating a communication flow between one or more lighting fixtures and the lighting management system in the lighting system according to one embodiment of the present disclosure.

As discussed above, each one of the lighting fixtures 48 may be associated with sensor circuitry, and sensor data from the sensor circuitry may be stored persistently in the lighting system 46 for subsequent access. Accordingly, FIG. 6 is a diagram illustrating a communication flow between one or more lighting fixtures 48 and the lighting management system 50 showing a process for persistently storing sensor data according to one embodiment of the present disclosure. First, a request for sensor data is sent from the lighting management system 50 to each one of a first lighting fixture 48A a second lighting fixture 48B, and a third lighting fixture 48C (step 100). In response to the request for sensor data, each one of the first lighting fixture 48A, the second lighting fixture 48B, and the third lighting fixture 48C obtain sensor data from sensor circuitry therein (step 102). As discussed above, the sensor data may be data from any sensor included in the lighting fixture 48. For example, the sensor data may include ambient light sensor data, occupancy sensor data, imaging sensor data, temperature sensor data, humidity sensor data, sound sensor data, accelerometer data, energy consumption data, and the like. Next, each one of the first lighting fixture 48A, the second lighting fixture 48B, and the third lighting fixture 48C provides the sensor data therefrom to the lighting management system 50 (step 104). While the first lighting fixture 48A, the second lighting fixture 48B, and the third lighting fixture 48C are shown sending the sensor data to the lighting management system 50 in a serial fashion, the transfer of the sensor data may occur substantially simultaneously. In response, the lighting management system 50 persistently stores the sensor data for later access (step 106), as discussed in detail below, and further may acknowledge receipt of the sensor data (step 108).

Figure 7:
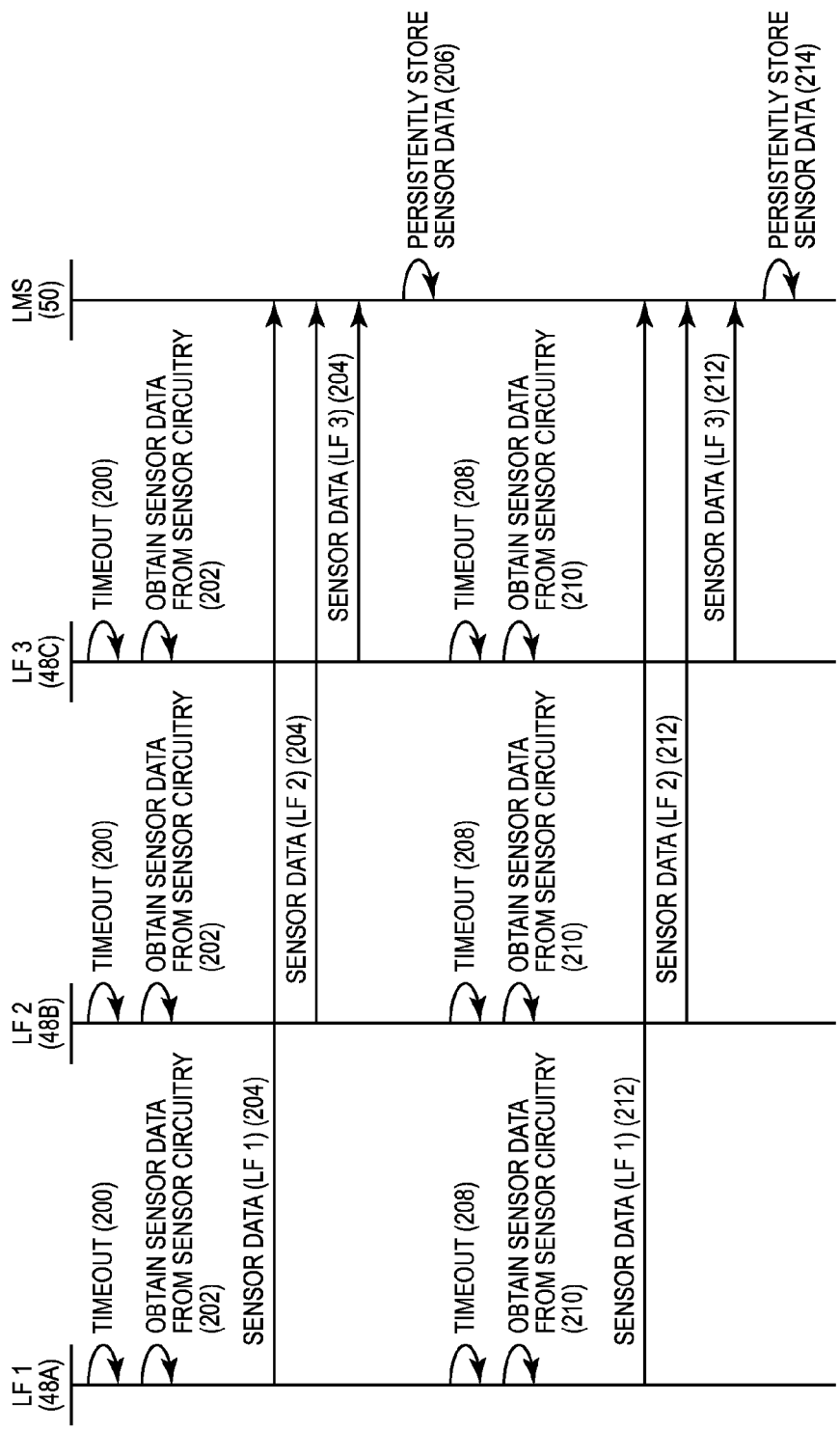
FIG. 7 is a diagram illustrating a communication flow between one or more lighting fixtures and the lighting management system in the lighting system according to an additional embodiment of the present disclosure.

While FIG. 6 shows an exemplary process for obtaining and storing sensor data from the lighting fixtures 48 in the lighting system 46, there are many different ways to accomplish this task. Accordingly, FIG. 7 is a diagram illustrating a communication flow between the one or more lighting fixtures 48 and the lighting management system 50 according to an additional embodiment of the present disclosure. First, a timeout event occurs in each one of the first lighting fixture 48A, the second lighting fixture 48B, and the third lighting fixture 48C (step 200). In response to the timeout event, each one of the first lighting fixture 48A, the second lighting fixture 48B, and the third lighting fixture 48C obtain sensor data from sensor circuitry therein (step 202). The first lighting fixture 48A, the second lighting fixture 48B, and the third lighting fixture 48C then send the obtained sensor data to the lighting management system 50 (step 204), which persistently stores the sensor data in response (step 206). The process may be repeated any number of times (see steps 208-214). While the timeout event is shown occurring at the same time in each one of the first lighting fixture 48A, the second lighting fixture 48B, and the third lighting fixture 48C, the timeout event may occur at different times in each one of the lighting fixtures 48. Further, the timeout event may occur either periodically or randomly, depending on the interval at which sensor data is intended to be collected. A user may set the timeout interval, for example, using the lighting management system 50.

Figure 8:
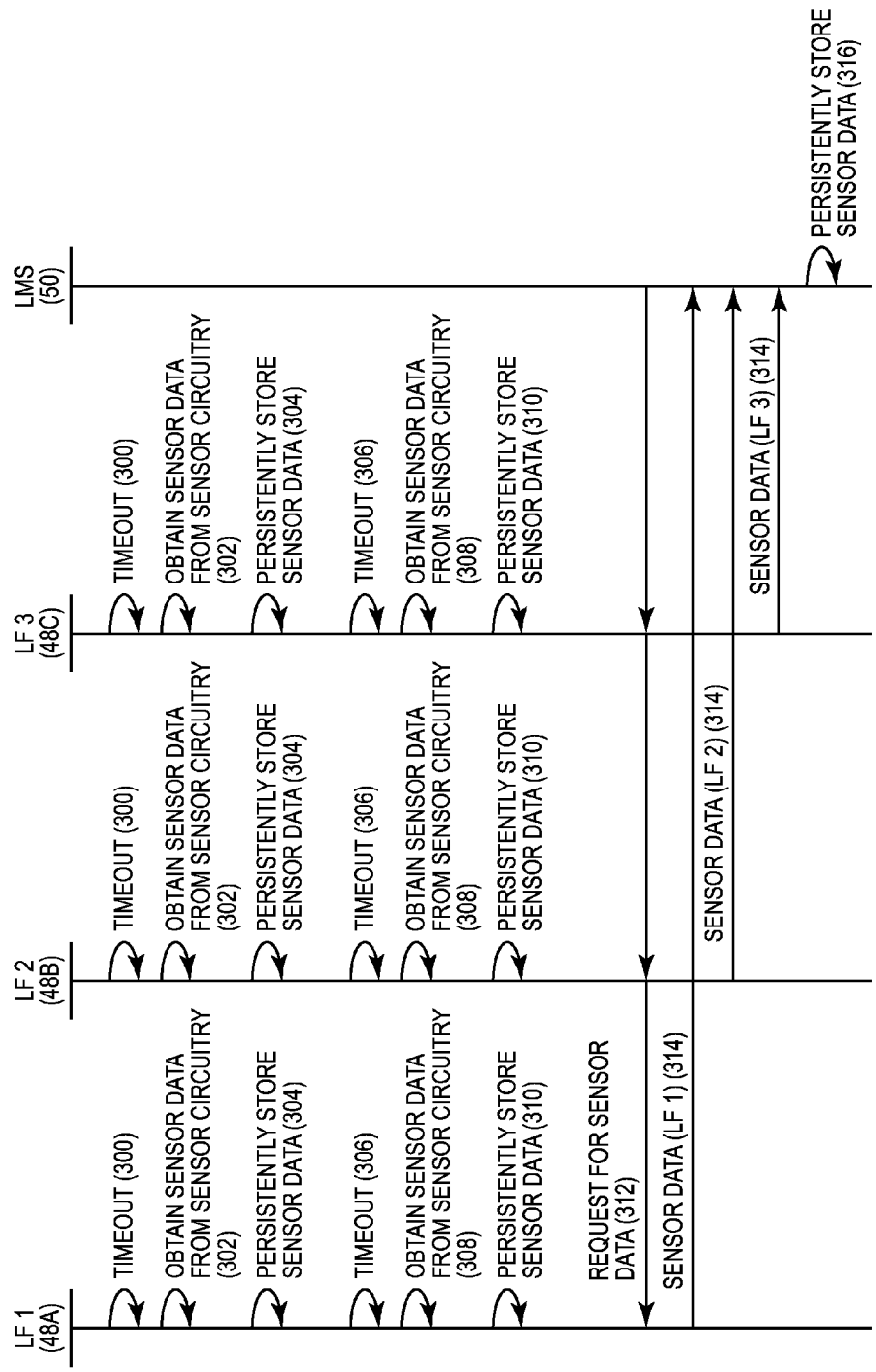
FIG. 8 is a diagram illustrating a communication flow between one or more lighting fixtures and the lighting management system in the lighting system according to an additional embodiment of the present disclosure.

FIG. 8 is a diagram illustrating a communication flow between the one or more lighting fixtures 48 and the lighting management system 50 according to an additional embodiment of the present disclosure. First, a timeout event occurs in each one of the first lighting fixture 48A, the second lighting fixture 48B, and the third lighting fixture 48C (step 300). In response to the timeout event, each one of the first lighting fixture 48A, the second lighting fixture 48B, and the third lighting fixture 48C obtain sensor data from sensor circuitry therein (step 302). The first lighting fixture 48A, the second lighting fixture 48B, and the third lighting fixture 48C, then each persistently store the sensor data (step 304). This process may be repeated any number of times (see steps 306-310). At some point, the lighting management system 50 may request sensor data from one or more of the first lighting fixture 48A, the second lighting fixture 48B, and the third lighting fixture 48C, or from any one of the lighting fixtures 48 individually (step 312). While the lighting management system 50 is shown requesting sensor data from each one of the first lighting fixture 48A, the second lighting fixture 48B, and the third lighting fixture 48C, the lighting management system 50 requests sensor data from any number of the lighting fixtures 48 without departing from the principles of the present disclosure. In response to the request, the first lighting fixture 48A, the second lighting fixture 48B, and the third lighting fixture 48C may provide all or a portion of the persistently stored sensor data to the lighting management system 50 (step 314). Finally, the lighting management system 50 may optionally persistently store the sensor data in addition to the lighting fixtures 48 (step 316).

Figure 9:
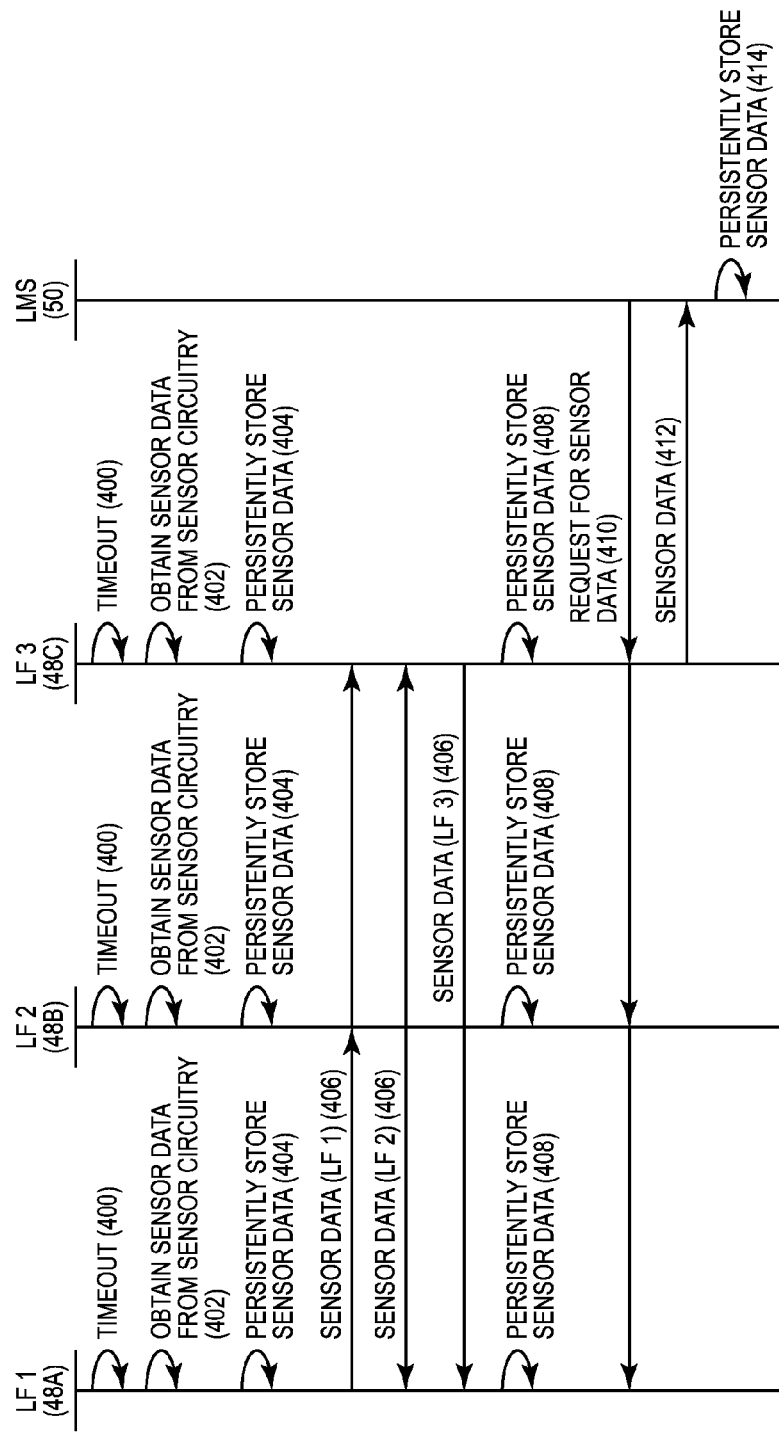
FIG. 9 is a diagram illustrating a communication flow between one or more lighting fixtures and the lighting management system in the lighting system according to an additional embodiment of the present disclosure.

FIG. 9 is a diagram illustrating a communication flow between the one or more lighting fixtures 48 and the lighting management system 50 according to an additional embodiment of the present disclosure. First, a timeout event occurs in each one of the first lighting fixture 48A, the second lighting fixture 48B, and the third lighting fixture 48C (step 400). In response to the timeout event, each one of the first lighting fixture 48A, the second lighting fixture 48B, and the third lighting fixture 48C obtain sensor data from sensor circuitry therein (step 402). The first lighting fixture 48A, the second lighting fixture 48B, and the third lighting fixture 48C may then optionally persistently store the sensor data (step 404). Additionally, the first lighting fixture 48A, the second lighting fixture 48B, and the third lighting fixture 48C may each provide all or a portion of the obtained sensor data to one or more other lighting fixtures 48 (step 406). Each one of the first lighting fixture 48A, the second lighting fixture 48B, and the third lighting fixture 48C may then optionally persistently store the sensor data from the other lighting fixtures 48 (step 408). Accordingly, all or a portion of the sensor data obtained from the lighting fixtures 48 in the lighting system 46 may be distributed across one or more lighting fixtures 48 therein. In one embodiment, a sensor data is sent to one or more designated storage lighting fixtures, which persistently store the sensor data. While not shown, this process may be repeated any number of times. At some point, the lighting management system 50 may request sensor data from any number of the lighting fixtures 48 (step 410). All or a portion of the lighting fixtures 48 receiving the request may respond with the requested sensor data (step 412), and the lighting management system 50 may then persistently store the sensor data (step 414). In one embodiment, the lighting management system 50 requests the sensor data from a single lighting fixture. Because all or a portion of the sensor data from multiple lighting fixtures 48 may be stored at a single fixture, the single fixture may be able to respond with sensor data for all or a portion of the lighting system 46.

While the foregoing examples illustrate several ways for persistently storing sensor data obtained for the lighting system 46, they are by no means exhaustive. Sensor data from the lighting fixtures 48 in the lighting system 46 may be stored in any number of ways, all of which are contemplated herein.

Figure 10:
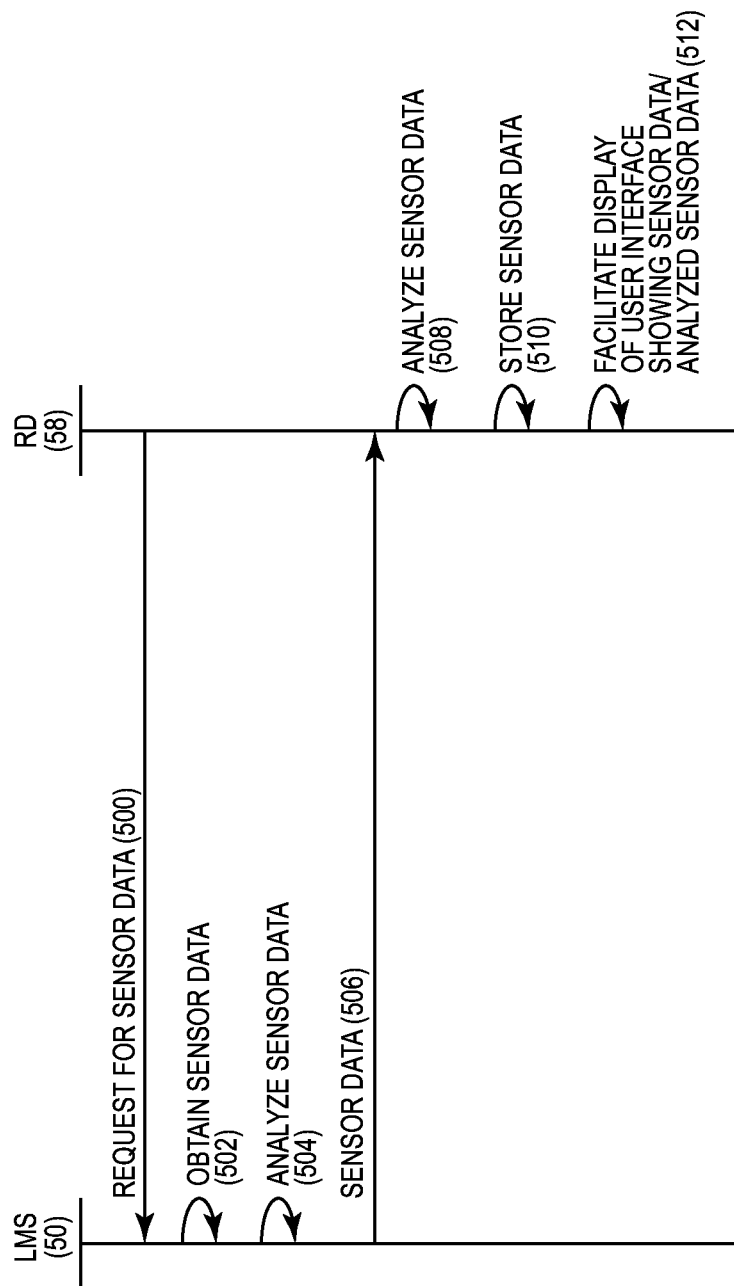
FIG. 10 is a diagram illustrating a communication flow between the lighting management system and a remote device according to one embodiment of the present disclosure.

FIG. 10 is diagram illustrating a communication flow between the lighting management system 50 and a remote device 58. Notably, FIG. 10 illustrates a communication flow after sensor data from one or more lighting fixtures 48 in the lighting system 46 has been persistently stored, as described above. First, a request for sensor data is sent from the remote device 58 to the lighting management system 50 (step 500). The lighting management system 50 then obtains the requested sensor data, which may include retrieving the sensor data from memory or requesting the sensor data from one or more lighting fixtures 48 in the lighting system 46 (step 502). The lighting management system 50 may then optionally analyze the sensor data (step 504). This step may be dependent on the request for the sensor data from the remote device 58. In one embodiment, analyzing the sensor data includes determining one or more suggested settings, for example, light output settings, for one or more of the lighting fixtures 48 in the lighting system 46 based on the sensor data. The lighting management system 50 then sends the requested sensor data to the remote device 58 (step 506). If the sensor data was not analyzed by the lighting management system 50 as mentioned above, the remote device 58 may optionally analyze the sensor data (step 508). Further, the remote device 58 may optionally store the sensor data (step 510), or may optionally facilitate the display of a user interface including the sensor data (step 512), for example, by providing instructions to a display. The user interface may allow a user to control one or more operational parameters of the lighting fixtures 48 in the lighting system 46 or view information about the lighting fixtures 48. Further, the user interface may accept input to perform various functions relating to the lighting system 46, as discussed in detail below. Finally, the user interface may display the sensor data in any number of desired ways. For example, the user interface may provide a list of the sensor data or may provide a visual representation of the sensor data. As discussed in detail below, the user interface may provide a visual representation of the sensor data in a spatial context, such that the sensor data is associated with a particular area in the space in which the lighting system 46 is located. In one embodiment, the remote device 58 communicates with the lighting management system 50 via the Internet. Accordingly, the request for the sensor data and the response from the lighting management system 50 may be facilitated via HTTP. The communication flow described above is merely exemplary, and is not exhaustive. The lighting management system 50 may communicate with any number of remote devices in many different ways in order to provide sensor data and/or analyzed sensor data from the lighting system 46 without departing from the principles of the present disclosure.

Figure 11:
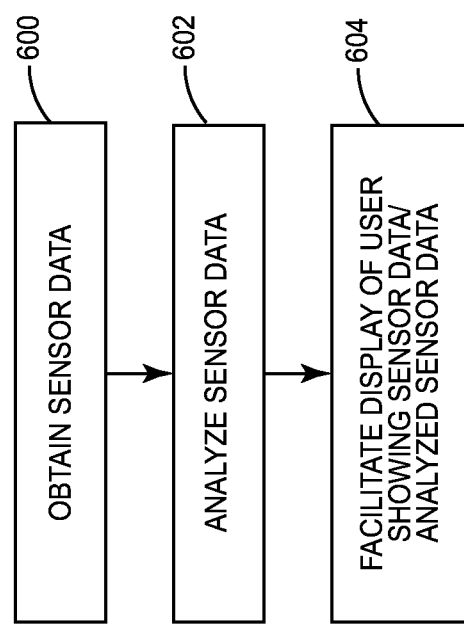
FIG. 11 is a diagram illustrating a method of operating the lighting management system according to one embodiment of the present disclosure.

While the lighting management system 50 may essentially be used as a gateway to the lighting system 46 as discussed above, the lighting management system 50 may also be interfaced with directly in order to perform one or more tasks. Accordingly, FIG. 11 is a flow diagram illustrating a number of steps that may be performed by the lighting management system 50 after sensor data has been persistently stored in the lighting system 46. First, the lighting management system 50 may obtain the sensor data, for example, by accessing the sensor data in memory or by requesting the sensor data from one or more lighting fixtures 48 in the lighting system 46 (step 600). Next, the lighting management system 50 may analyze the sensor data (step 602). In one embodiment, analyzing the sensor data comprises determining one or more suggested settings, for example, light output settings, for one or more of the lighting fixtures 48 in the lighting system 46 based on the sensor data. In one embodiment, the lighting management system 50 is associated with a display. Accordingly, the lighting management system 50 may facilitate the display of a user interface by sending one or more instructions to the display (step 604). The user interface may allow a user to control one or more operational parameters of the lighting fixtures 48 in the lighting system 46 or view information about the lighting fixtures 48. Further, the user interface may accept input to perform various functions relating to the lighting system 46, as discussed in detail below. Finally, the user interface may display the sensor data in any number of desired ways. For example, the user interface may provide a list of the sensor data or may provide a visual representation of the sensor data. As discussed in detail below, the user interface may provide a visual representation of the sensor data in a spatial context, such that the sensor data is associated with a particular area in the space in which the lighting system 46 is located.

As discussed above, analyzing the sensor data, which may be accomplished by either the lighting management system 50 or the remote device 58, may include determining one or more suggested settings, for example, light output settings, for one or more of the lighting fixtures 48 in the lighting system 46 based on the sensor data. In one exemplary embodiment, the sensor data may include occupancy sensor data. Accordingly, the sensor data may describe occupancy events occurring in one or more of the lighting fixtures 48 over a period of time. If, for example, a particular lighting fixture or lighting fixtures 48 consistently failed to detect occupancy between the hours of 10 a.m. and 12 p.m., the lighting management system 50 determine a suggested setting to turn the light output from these lighting fixtures 48 off during that period of time. The lighting management system 50 and/or the remote device 58 may facilitate the presentation of a user interface showing the suggested settings and allowing for their implementation. Additional suggested settings may be determined by analyzing the sensor data in any number of different ways. In additional embodiments, the lighting fixtures 48 themselves may analyze the sensor data in order to determine and implement one or more suggested settings as discussed above.

In additional embodiments, analyzing the sensor data may include analyzing the sensor data for one or more patterns used to describe a space. For example, analyzing the sensor data may include analyzing occupancy events detected by one or more lighting fixtures 48 in the lighting system 46 in order to determine normal traffic patterns within a space. This may be exceptionally useful, for example, in retail environments in which it is desirable to track customer movement and interest. Further, analyzing the sensor data may include analyzing one or more temperature measurements taken by one or more lighting fixtures 48 in the lighting system 46 in order to determine areas in order to adjust one or more HVAC settings. The sensor data may be analyzed in any number of ways, which may characterize any number of aspects of a space in which the lighting system 46 is located. Due to the fact that lighting fixtures are generally located throughout a space, storing and analyzing data therefrom may provide valuable insights about a space. Modern solid-state lighting fixtures such as those manufactured by Cree, Inc. of Durham, N.C. may be retrofitted with any number of sensors and/or may be manufactured with an array of sensors in order to act as a sensor network in the space. Because the lighting infrastructure is already in place, providing such a sensor network may be accomplished with minor effort and at a low cost.

As discussed above, because the lighting fixtures 48 in the lighting system 46 are located at a number of different static locations that are distributed throughout a space, the lighting fixtures 48 offer a good platform for sensors that may be used to characterize the space. However, in order to characterize a space, it may be desirable or necessary to know the location of each one of the lighting fixtures 48. Additional functionality of the lighting system 46 not related to the collection and/or analysis of sensor data may also benefit from the inclusion of the fixture location information. Accordingly, each one of the lighting fixtures 48 may be associated with fixture location information, which may describe the location of the lighting fixture. The fixture location information may be nested, such that the fixture location information describes the location of the lighting fixture in several different levels of granularity. For example, the fixture location information may describe the location of the lighting fixture in terms of a building, a floor, and a room (e.g., "Building 1>Floor 2>Conference Room A"). The fixture location information may be stored locally at each one of the lighting fixtures 48, may be stored by the lighting management system 50, may be stored remotely to the lighting system 46, for example, by a remote device, or may be distributed across all or a portion of the lighting fixtures 48. In one embodiment, the fixture location information is a human readable text string, such that the location of the lighting fixture is apparent upon reading the text string.

Figure 12:
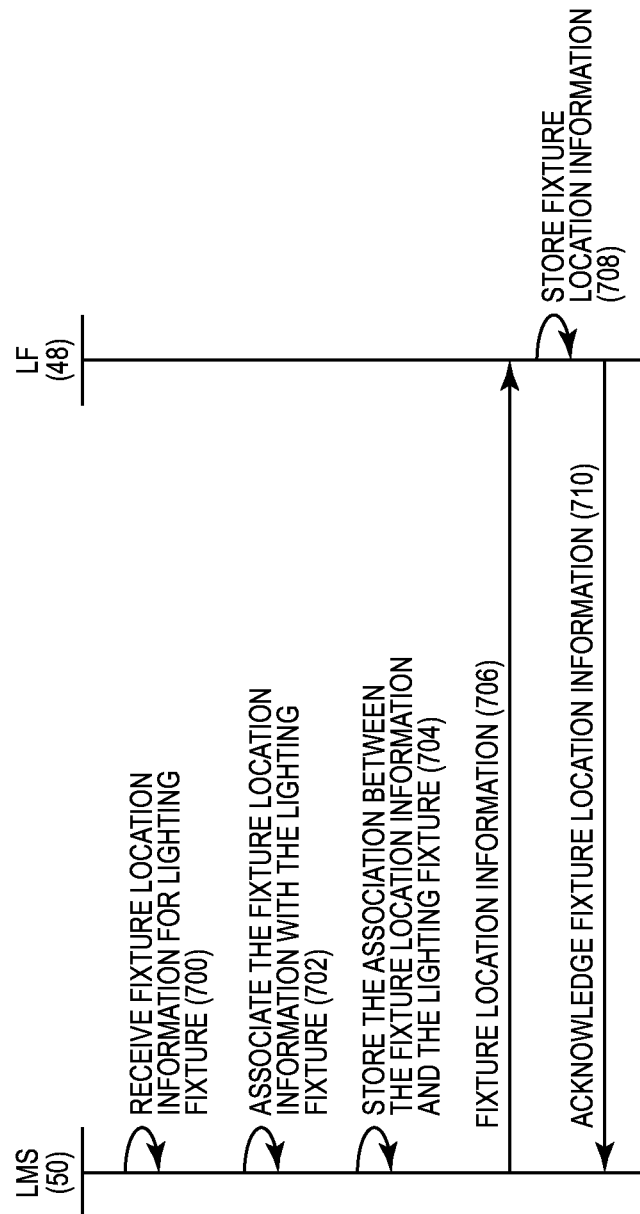
FIG. 12 is a diagram illustrating a communication flow between the lighting management system and a lighting fixture in the lighting system according to one embodiment of the present disclosure.

FIG. 12 is a diagram illustrating a communication flow between the lighting management system 50 and a lighting fixture 48 in the lighting system 46 in order to assign fixture location information thereto. First, the lighting management system 50 receives fixture location information for a particular lighting fixture 48 in the lighting system 46 (step 700). In one embodiment, the fixture location information may be received directly from a user input device. For example, the lighting management system 50 may instruct a display to provide a user interface showing a number of different lighting fixtures that are located within a space and a number of different locations within the space. The lighting management system 50 may then instruct the display and one or more user input peripherals to facilitate a drag-and-drop operation in which a visual representation of the lighting fixture (e.g., an icon) is dragged onto one of the locations such that the fixture location information corresponds with the location on which the lighting fixture was dropped. In another embodiment, the fixture location information is received from a remote device, for example, via the Internet. The fixture location information may be received in any number of ways, all of which are contemplated herein.

Next, the lighting management system 50 associates the received fixture location information with the lighting fixture 48 for which it is intended (step 702). The lighting management system 50 may additionally store the association between the fixture location information and the lighting fixture 48 for which it is intended, for example, in a look-up-table (step 704). Further, the lighting management system 50 may optionally send the received fixture location information to all or a portion of the lighting fixtures 48 (step 706). If the fixture location information is sent to the lighting fixture 48, the lighting fixture 48 may store the fixture location information locally in response to the receipt thereof (step 708). Further, the lighting fixture 48 may optionally send an acknowledgement of the fixture location information to the lighting management system 50 (step 710). While not shown, the lighting fixture 48 and/or the lighting management system 50 may also send the fixture location information to additional lighting fixtures 48 in the lighting system 46, which may store the fixture location information in association with the lighting fixture 48 for which it is intended such that fixture location information for the lighting fixtures 48 is distributed across all or a portion of the lighting fixtures 48. Notably, FIG. 12 illustrates an exemplary communication flow between the lighting management system 50 and the lighting fixture 48. The fixture location information may be associated with the lighting fixture 48 in any number of different ways, all of which are contemplated herein. Further, while the lighting management system 50 is shown interfacing with the lighting fixture 48 in order to associate the fixture location information therewith, any number of different devices may be operated in order to accomplish the same objective without departing from the principles of the present disclosure.

Figure 13:
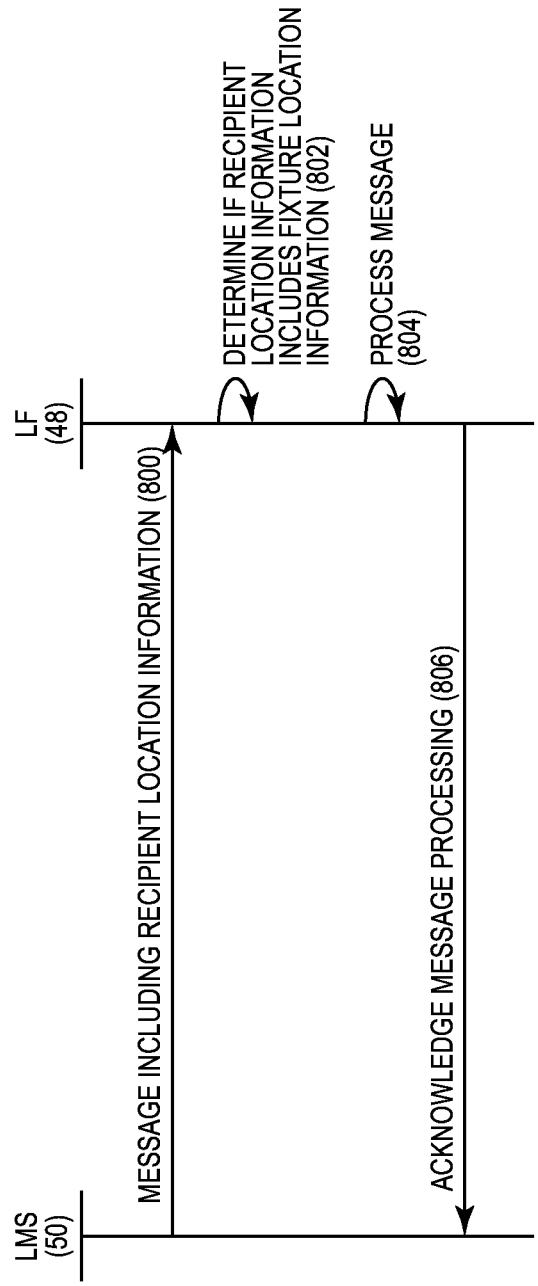
FIG. 13 is a diagram illustrating a communication flow between the lighting management system and a lighting fixture in the lighting system according to one embodiment of the present disclosure.

Once fixture location information is associated with one or more lighting fixtures 48 in the lighting system 46, the fixture location information may be used in any number of different ways in order to enhance the functionality of the lighting system 46. As discussed above, it is often desirable to control lighting fixtures that are in close physical proximity, for example, in the same room, together. Accordingly, FIG. 13 is a diagram illustrating a communication flow between the lighting management system 50 and a lighting fixture 48 in which fixture location information is used to determine whether a message from the lighting management system 50 should be processed by the lighting fixture 48. First, a message including instructions and recipient location information is sent from the lighting management system 50 to the lighting fixture 48 (step 800). The recipient location information indicates one or more locations intended to receive and act upon the instructions. The lighting fixture 48 then determines if the recipient location information includes the fixture location information associated with the lighting fixture (step 802). If the recipient location information includes the fixture location information, the lighting fixture 48 may then optionally process the message (step 804), and further may optionally send an acknowledgement that the message has been processed (step 806). Accordingly, messages sent throughout the lighting system 46 may only be processed at certain locations. Using the fixture location information to selectively process messages from the lighting management system 50 may allow for more intuitive control of the lighting system 46.

Processing the message may include executing a command indicated in the instructions. For example, the instructions may include a command to adjust a light output of the lighting fixture 48. For example, the instructions may include a command to adjust a light intensity, a color, and/or a color temperature of the light output of the lighting fixture 48. Accordingly, processing the message may include adjusting the light output of the lighting fixture 48 as indicated. In another embodiment, instructions may include a command to adjust one or more sensor operating parameters of the lighting fixture 48. For example, the instructions may include a command to adjust an ambient light sensor sensitivity, an occupancy sensor sensitivity, and/or a sensor detection mode (which may indicate which sensors are used, the mode of a particular sensor, etc.) of the lighting fixture 48. Accordingly, processing the message may include adjusting the sensor operating parameters of the lighting fixture 48 as indicated. In an additional embodiment, the instructions may include a command to adjust one or more operational parameters of the lighting fixture 48. For example, the instructions may include a command to adjust an energy consumption operational parameter of the lighting fixture (indicating a desired energy consumption target for the lighting fixture), a control group operational parameter (indicating a group in which the lighting fixture belongs that should execute commands together), an occupancy group operational parameter (indicating a group in which the lighting fixture belongs that should respond to occupancy events detected by an occupancy sensor together), and the like. Accordingly, processing the message may include adjusting the operational parameters of the lighting fixture 48 as indicated. Finally, instructions may include a request for information from the lighting fixture 48. For example, the instructions may include a request for sensor data from one or more sensors in the lighting fixture 48. Accordingly, processing the message may include providing the requested information.

Figure 14:
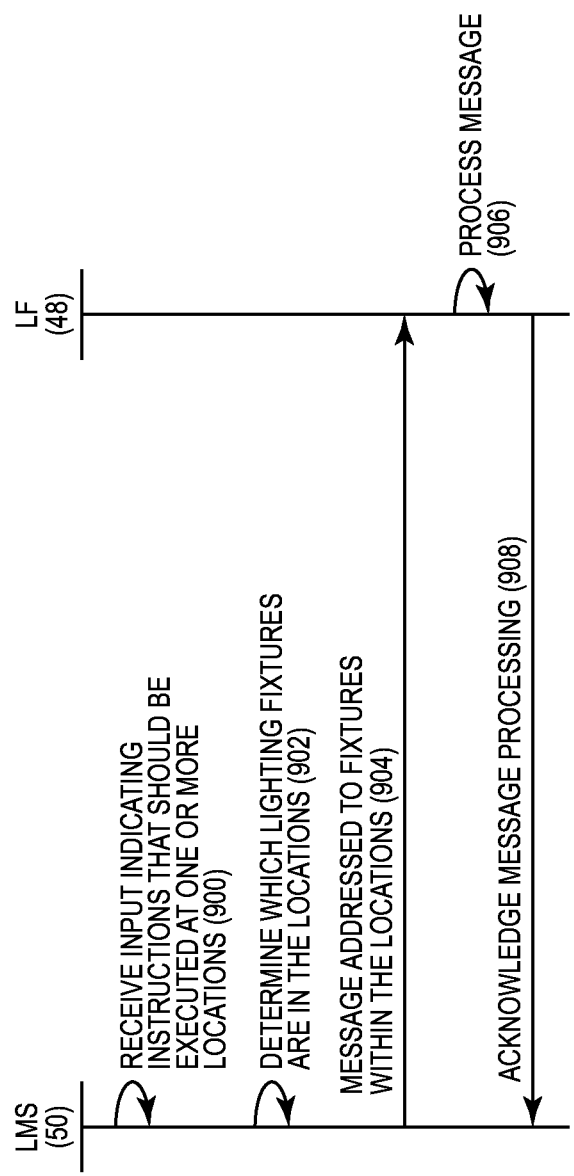
FIG. 14 is a diagram illustrating a communication flow between the lighting management system and a lighting fixture in the lighting system according to one embodiment of the present disclosure.

Notably, the communication flow described in FIG. 13 is only applicable to lighting fixtures 48 storing their own fixture location information. Accordingly, FIG. 14 is a diagram illustrating a communication flow between the lighting management system 50 and a lighting fixture 48 according to an alternative embodiment of the present disclosure. First, the lighting management system 50 receives input indicating instructions that should be executed at one or more locations within a space in which the lighting system 46 is located (step 900). The input may be received directly by a user input device, or from remote device, for example, via the Internet. The lighting management system 50 then determines which lighting fixtures 48 in the lighting system 46 are within the locations specified by the input (step 902). This may be accomplished, for example, by looking up the fixture location information associated with each lighting fixture 48. The lighting management system 50 then sends a message including the instructions to each one of the lighting fixtures 48 with fixture location information indicating that the location of the lighting fixture 48 is within the locations specified by the input (step 904). For example, the lighting management system 50 may send the message specifically addressed only to those lighting fixtures indicated above. The lighting fixtures 48 may be configured to process the message if it is addressed thereto (step 906), and may optionally send an acknowledgement that the message has been processed (step 908). Accordingly, the message may be processed only at the locations indicated by the input.

Figure 15:
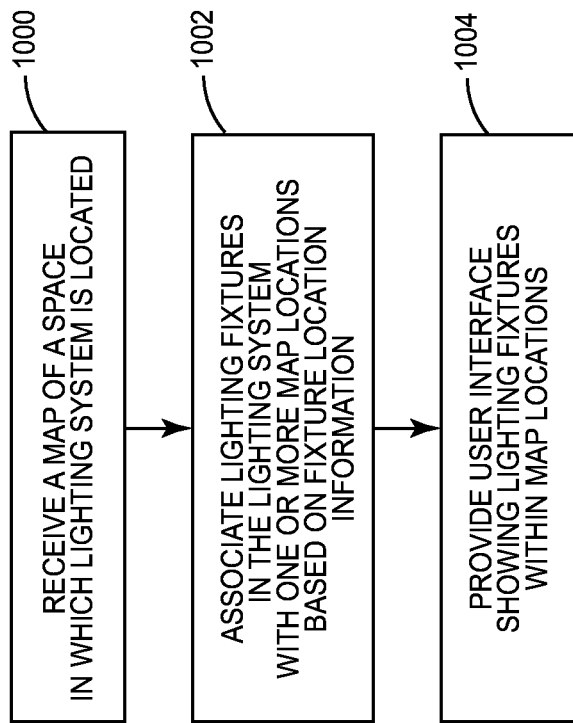
FIG. 15 is a diagram illustrating a method of associating one or more lighting fixtures in the lighting system with fixture location information.

In addition to the intuitive control of lighting fixtures by referencing them by their physical location, the fixture location information may also be useful in the display of data (e.g., via a user interface) from the lighting system 46. Accordingly, FIG. 15 is a flow diagram describing a process for constructing a spatial representation of the lighting system 46 according to one embodiment of the present disclosure. First, a map of a space in which the lighting system 46 is located is provided (step 1000). The map may designate a number of different locations therein. Further, the map may describe the space in spatial coordinates. The number of different locations may each be associated with a set of the spatial coordinates. The map may be provided as a physical image, which is digitized, for example, via scanning process, or may be provided as an electronic file such as an image file, a vector shape file, or the like. Next, each one of the lighting fixtures 48 in the lighting system may be associated with one or more of the different locations on the map based on the fixture location information associated therewith (step 1002). In one embodiment, each one of the different locations on the map is associated with map location information, which may be matched with the fixture location information in order to associate a particular lighting fixture 48 with the location. For example, lighting fixtures 48 including fixture location information "Conference Room A" may be associated with a location on the map with map location information including "Conference Room A". A user interface may then optionally be provided showing a visual representation of the lighting fixtures 48 within the set of spatial coordinates indicated by their associated location on the map (step 1004). If multiple lighting fixtures 48 are located within a single location on the map, these lighting fixtures may be spatially distributed equally throughout the displayed location, or may be displayed in any other suitable manner. The foregoing steps may be accomplished by the lighting management system 50 or a remote device to the lighting system 46.

Figure 16:
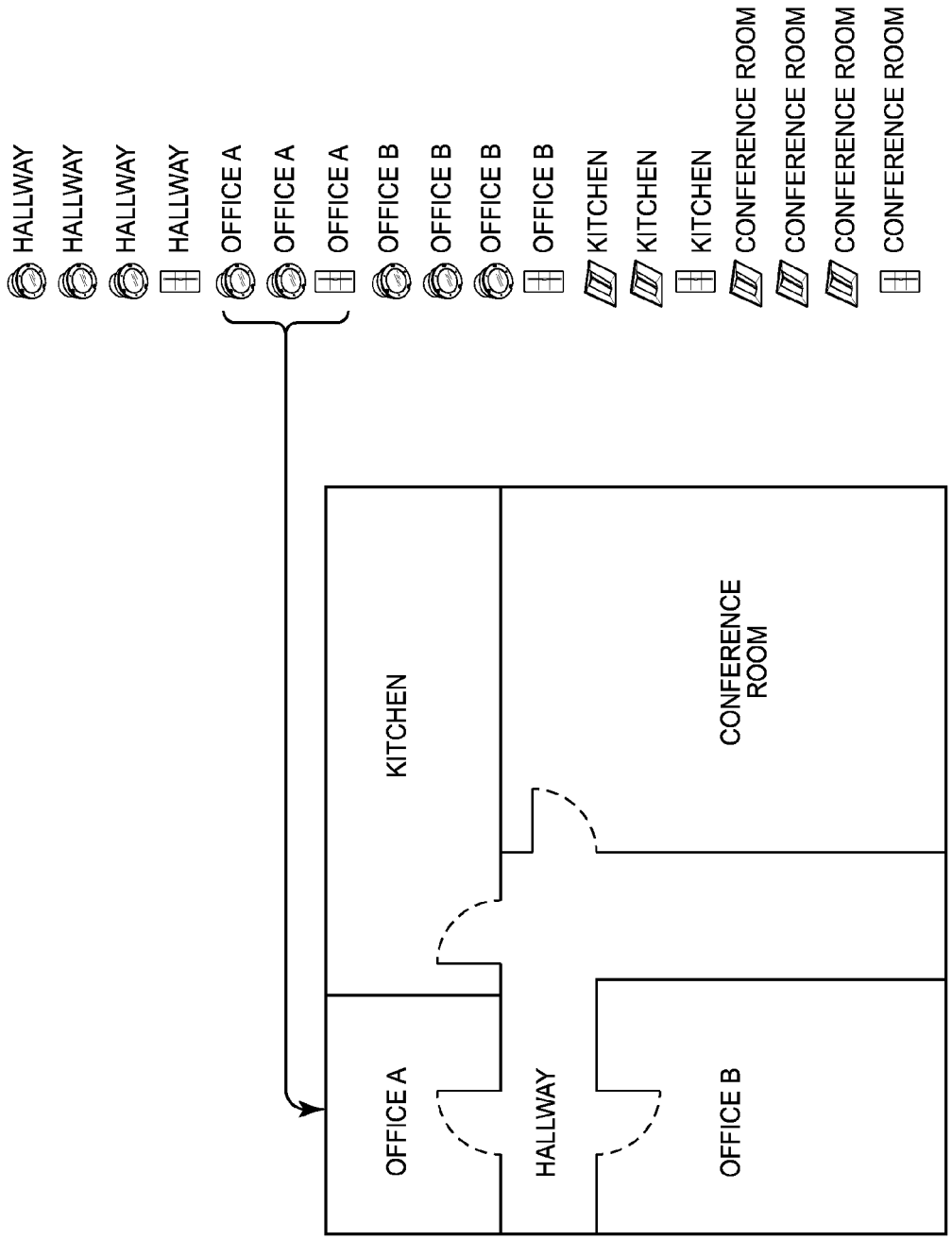
FIG. 16 is a diagram illustrating the method described in FIG. 15.

FIG. 16 illustrates the process described by FIG. 15. As shown in FIG. 16, a map includes the number of different locations, each of which is separated by a line and described by map location information printed therein. Note that while the locations correspond to different rooms in the map shown in FIG. 16, the locations may be arbitrarily defined as desired without departing form the principles of the present disclosure. For example, a single room may include multiple locations if desired. Each one of the lighting fixtures 48 in the lighting system 46 is associated with fixture location information, which is matched to the map location information to determine which locations the lighting fixture 48 should be associated with. In particular, FIG. 16 shows a visual representation of the lighting fixtures 48 (an icon) including fixture location information "Office A" being associated with the location on the map with map location information "Office A". The other lighting fixtures 48 may be similarly associated with the other locations indicated on the map. Further, FIG. 16 shows a number of wall controls (shown as a square switch such as a wall-mounted dimmer switch), which may allow for the control of a particular location or locations similarly being associated with a location on the map. The wall controls may include one or more sensors, which, as discussed in detail below, may be used to collect information about a particular location.

Figure 17:
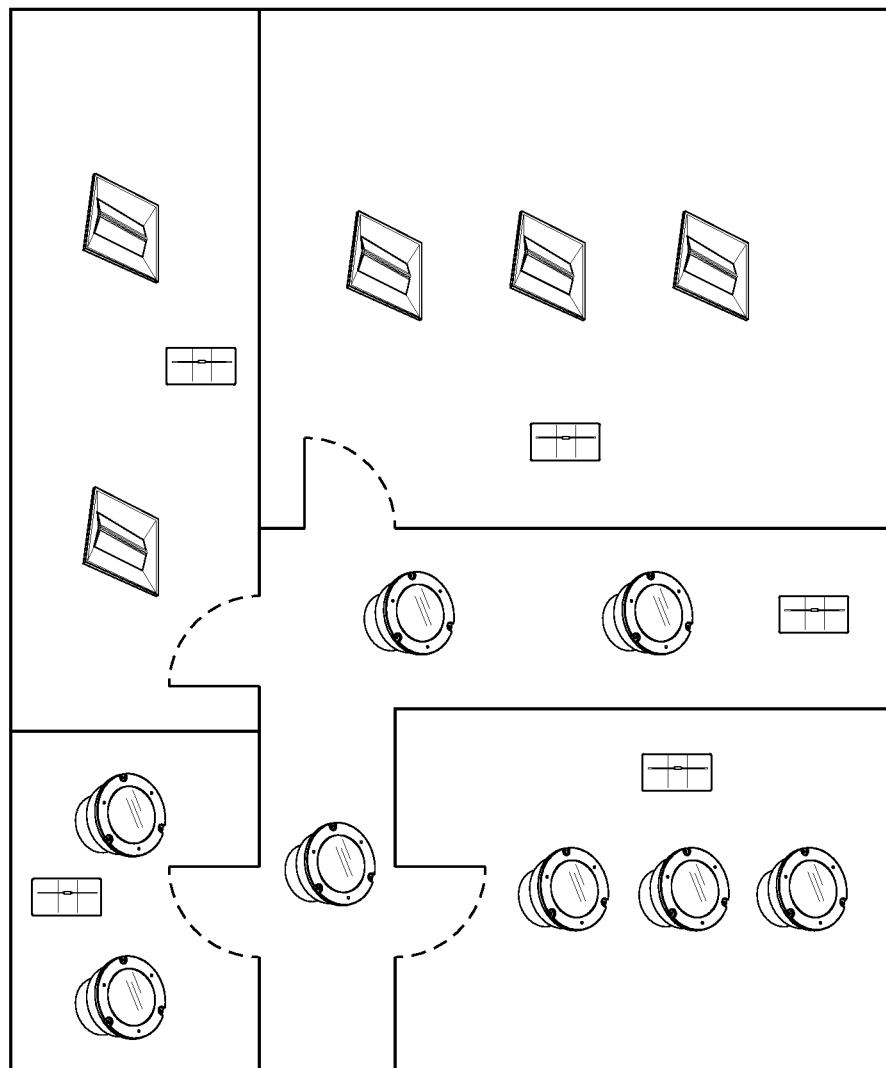
FIG. 17 shows an exemplary user interface including a spatial representation of one or more lighting fixtures in the lighting system.

FIG. 17 illustrates an exemplary user interface showing a visual representation of the lighting fixtures 48 (an icon) and the wall controls within the location on the map with which the lighting fixture 48 is associated. As shown, the lighting fixtures 48 and wall controls associated with each location within the map are displayed therein. The user interface may allow a user to interact with the map, for example, by selecting a particular location, a particular lighting fixture 48, and/or a particular wall control within the location. Selecting a location may allow a user to control one or more settings of the lighting fixtures 48 therein or view information from one or more lighting fixtures 48 therein. Selecting a lighting fixture 48 and/or a wall control may allow a user to control one or more settings of the particular lighting fixture 48 and/or wall control or view information from the lighting fixture 48 and/or wall control. In general, providing the user interface including the map and the lighting fixtures 48 shown within the locations of the map provides an intuitive way to control and view information from the lighting fixtures 48 and/or the wall controls in the lighting system 46.

Figure 18A:
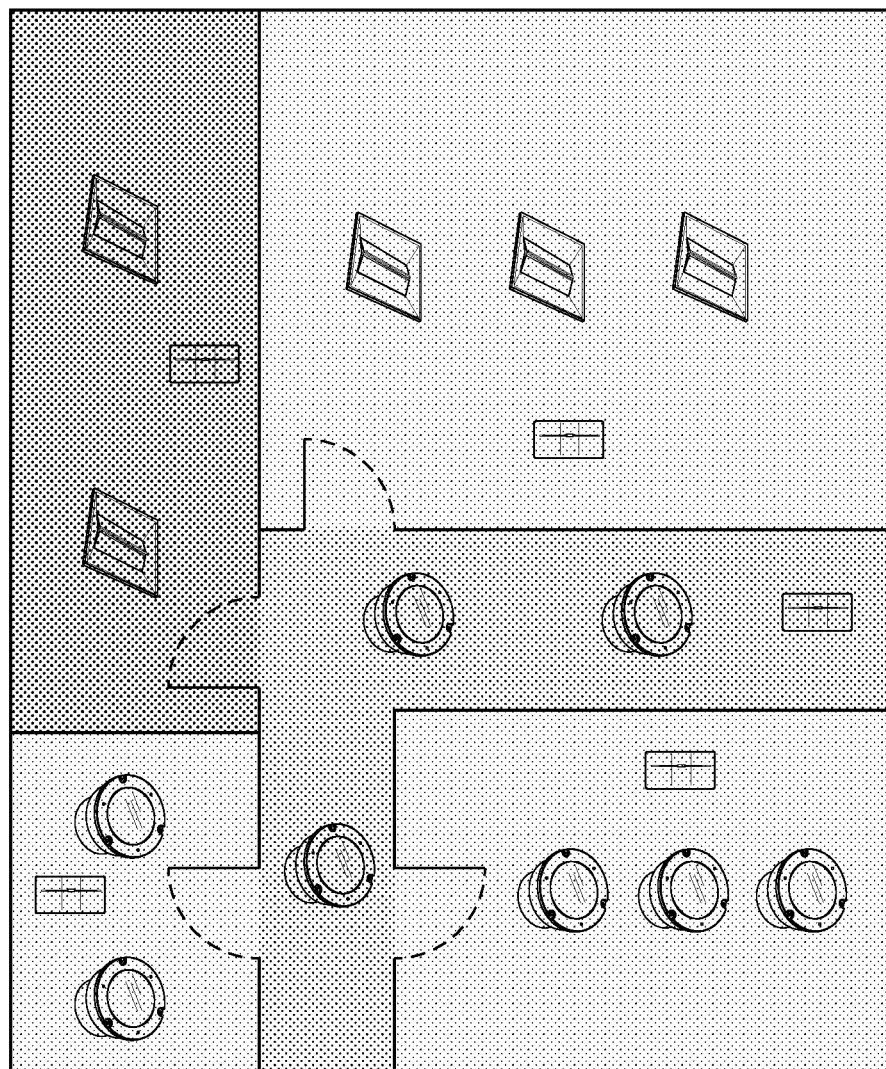
FIGS. 18A through 18C show exemplary user interfaces including a spatial representation of sensor data from one or more lighting fixtures in the lighting system.
Figure 18B:
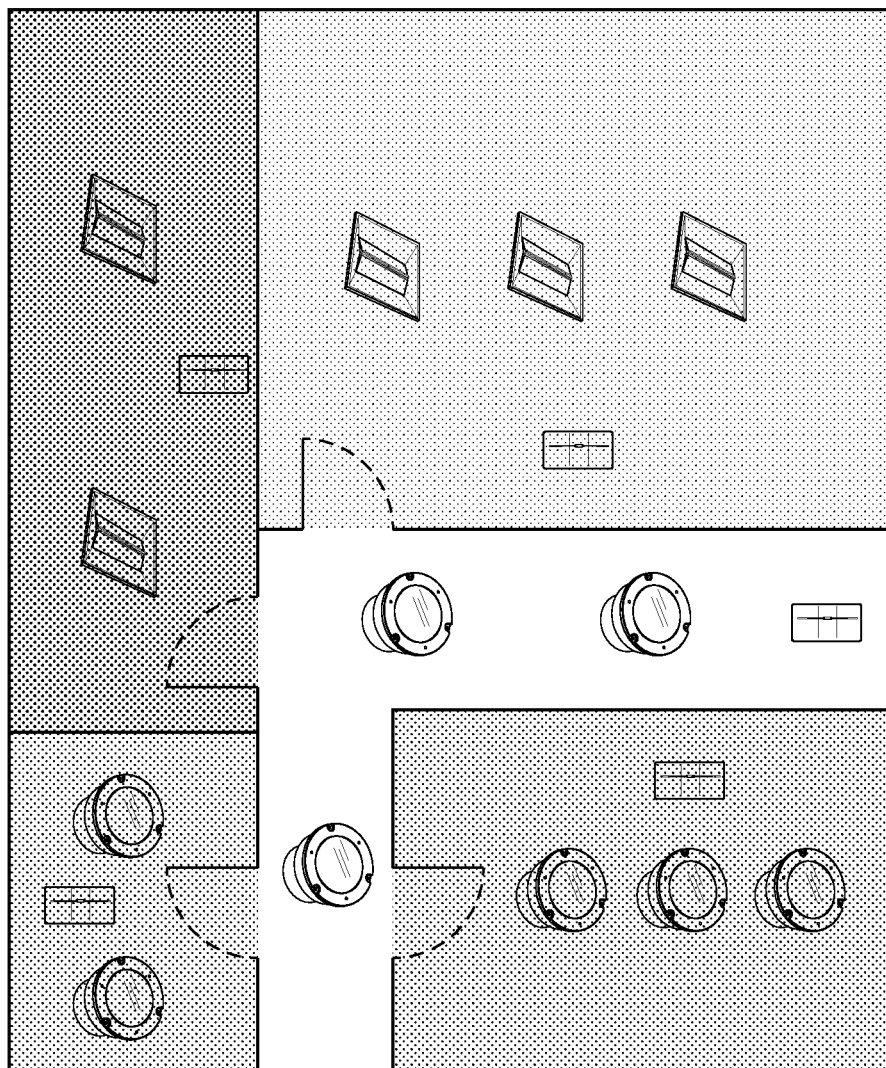
Figure 18C:
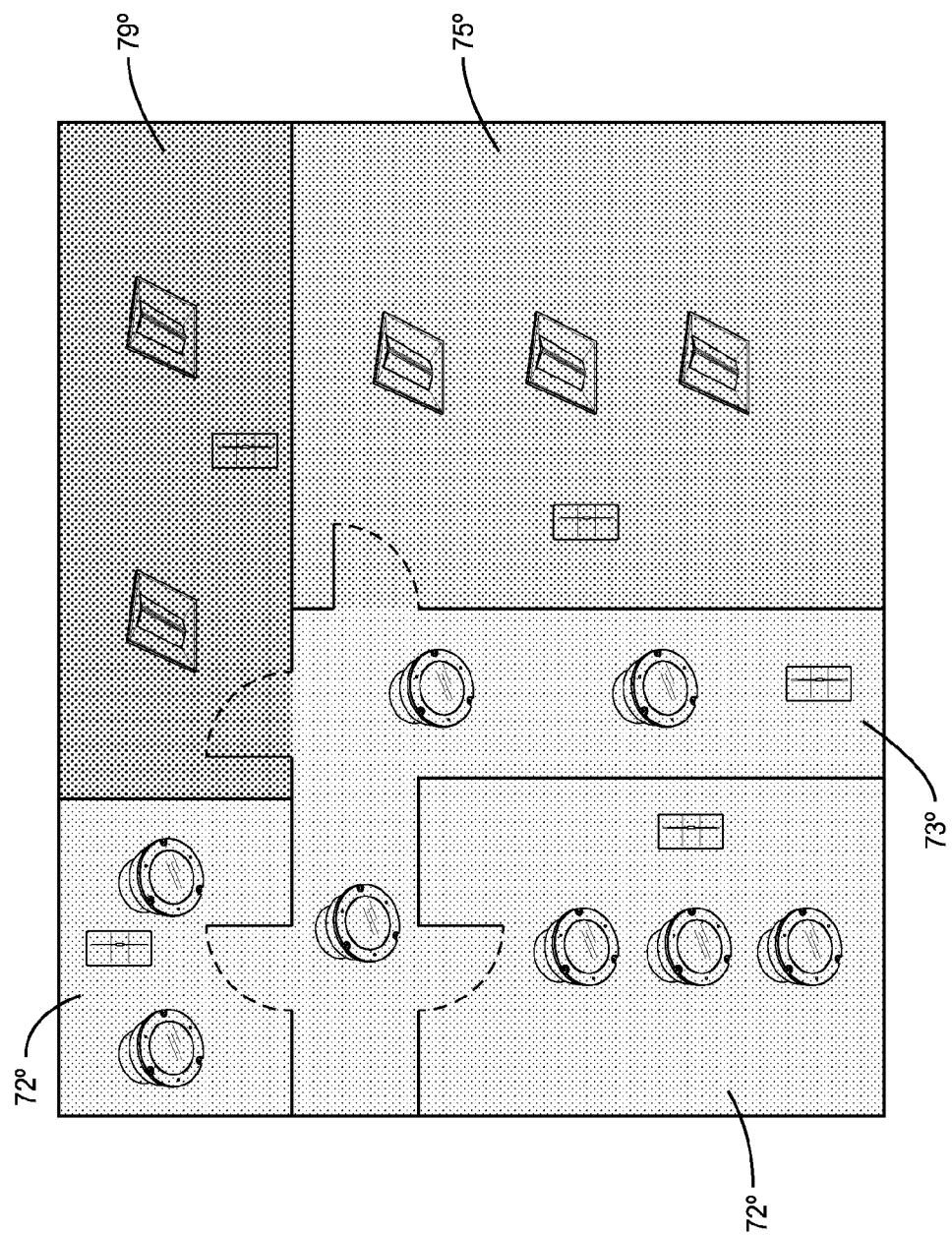

In addition to the user interface discussed above with respect to FIG. 17, it may be desirable to display sensor data from one or more of the lighting fixtures 48 and/or wall controls in the lighting system 46 using a similar approach. Accordingly, FIGS. 18A through 18C show exemplary user interfaces wherein sensor data is overlaid on top of the map according to the location in which it was collected. In particular, the shade (which may represent color) of the area within the map represents sensor data collected from the lighting fixtures 48. In particular, FIG. 18A shows exemplary occupancy sensor data collected from the lighting fixtures 48 in the lighting system 46, with darker shading representing a higher frequency of occupancy events detected within a period of time than lighter shading. Accordingly, it is easy to discern that the conference room is rarely used, while the kitchen is heavily trafficked. FIG. 18B shows exemplary ambient light sensor data collected from the lighting fixtures 48 in the lighting system 46, with darker shading representing more ambient light detection than lighter colors. Accordingly, it is easy to discern that the area near the perimeter of the building (i.e., the area with windows) receives significantly more ambient light than the interior portions of the building. Finally, FIG. 18C shows exemplary energy consumption data collected from the lighting fixtures 48 in the lighting system 46. Accordingly, it is easy to discern that the kitchen lighting consumes more power than any other area in the building. One or more operational parameters of the kitchen lighting may then be adjusted to account for this fact and lower the overall energy consumption of the building. Notably, FIGS. 18A through 18C are only exemplary. In general, sensor data of any type may be overlaid on the map to provide valuable insights regarding a space in which the lighting system 46 is located. While the sensor data for each one of FIGS. 18A through 18C is shown as an average value for the particular location in which the lighting fixtures 48 are located (i.e., the sensor data is displayed with a resolution equal to that of the location in which the lighting fixtures 48 are located), the sensor data may be displayed in any resolution that the lighting fixtures 48 are capable of obtaining. For example, the sensor data may be displayed at a resolution of a square meter, a square foot, or the like without departing from the principles of the present disclosure.

As discussed above, sensor data from the lighting fixtures 48 may be used to analyze a retail space. For example, by analyzing the number of occupancy events in a certain area of a retail space (see FIG. 18), one may be able to determine which areas generate the highest amount of traffic. Such information may be used to determine the success of certain products and/or product lines. Imaging sensors (i.e., cameras) and sound sensors (i.e., microphones) may further enrich the sensor data and allow for even more detailed analytics to be achieved. For example, imaging sensors may allow for the differentiation of customers from employees, for example, by filtering out those individuals wearing a certain color (e.g., via computer vision techniques). Further, sound sensors may allow for the detection of keywords or phrases, which may indicate customer interest or disinterest. All of the above sensor data may be combined and analyzed to characterize a space in any number of different ways.

Those skilled in the art will recognize improvements and modifications to the preferred embodiments of the present disclosure. All such improvements and modifications are considered within the scope of the concepts disclosed herein and the claims that follow.

What is claimed is:

1. A lighting fixture comprising:
   an LED light source;
   a housing coupled to the light source and comprising an opening through which light from the light source is provided;
   communications circuitry;
   sensor circuitry; and
   control circuitry comprising a memory storing instructions, which, when executed by the control circuitry cause the lighting fixture to transmit sensor data obtained from the sensor circuitry via the communications circuitry for persistent storage of the sensor data.

2. The lighting fixture of claim 1 wherein the sensor circuitry comprises one or more of an ambient light sensor, an occupancy sensor, an imaging sensor, a temperature sensor, and a humidity sensor.

3. The lighting fixture of claim 2 wherein the sensor data comprises one or more of ambient light sensor data, occupancy sensor data, imaging sensor data, temperature sensor data, and humidity sensor data.

4. The lighting fixture of claim 1 wherein the memory stores further instructions, which, when executed by the control circuitry cause the lighting fixture to transmit the sensor data periodically.

5. The lighting fixture of claim 1 wherein the memory stores further instructions, which, when executed by the control circuitry cause the lighting fixture to transmit the sensor data in response to a request for the sensor data.

6. A lighting management system comprising:
   communications circuitry;
   processing circuitry; and a memory storing instructions, which, when executed by the processing circuitry cause the lighting management system to persistently store sensor data obtained from sensor circuitry on each one of a plurality of lighting fixtures.

7. The lighting management system of claim 6 wherein the memory stores further instructions, which, when executed by the processing circuitry cause the lighting fixture to persistently store the sensor data in response to receipt of the sensor data via the communications circuitry.

8. The lighting management system of claim 6 wherein the memory stores further instructions, which, when executed by the processing circuitry cause the lighting fixture to:
request the sensor data from each one of the plurality of lighting fixtures; and
in response to receipt of the sensor data via the communications circuitry, persistently store the sensor data.

9. The lighting management system of claim 8 wherein the memory stores further instructions, which, when executed by the processing circuitry cause the lighting fixture to periodically request the sensor data from each one of the plurality of lighting fixtures.

10. The lighting management system of claim 6 wherein the sensor data includes one or more of ambient light sensor data, occupancy sensor data, imaging sensor data, temperature sensor data, and humidity sensor data.

11. The lighting management system of claim 6 wherein the memory stores further instructions, which, when executed by the processing circuitry cause the lighting management system to provide the stored sensor data via the communications circuitry upon a request for the stored sensor data.

12. The lighting management system of claim 11 wherein the stored sensor data is provided via the Internet.

13. The lighting management system of claim 12 wherein the request for the stored sensor data is a hypertext transfer protocol (HTTP) request.

14. The lighting management system of claim 6 wherein the memory stores further instructions, which, when executed by the processing circuitry cause the lighting management system to analyze the stored sensor data to determine at least one suggestion for one or more settings of at least one of the plurality of lighting fixtures based on the stored sensor data.

15. The lighting management system of claim 14 wherein the memory stores further instructions, which, when executed by the processing circuitry cause the lighting management system to instruct a display to provide a user interface showing the at least one suggestion for one or more settings of the at least one of the plurality of lighting fixtures.

16. The lighting management system of claim 14 wherein the one or more settings include one or more of an ambient light level sensor sensitivity setting, an occupancy sensor sensitivity setting, an energy consumption setting, a brightness setting, an ON/OFF setting, a color setting, and a color temperature setting.

17. The lighting management system of claim 6 wherein the memory stores further instructions, which, when executed by the processing circuitry cause the lighting management system to instruct a display to provide a user interface showing a spatial representation of the stored sensor data wherein the sensor data obtained from each lighting fixture is displayed within a location on the display that is indicative of the location of the lighting fixture from which it was obtained.

18. The lighting management system of claim 17 wherein the memory stores further instructions, which, when executed by the processing circuitry cause the lighting management system to, for each one of the plurality of lighting fixtures:
receive user input including fixture location information describing a location of a particular one of the plurality of lighting fixtures; and
associate the particular one of the plurality of lighting fixtures with the fixture location information.

19. The lighting fixture of claim 18 wherein the memory stores further instructions, which, when executed by the processing circuitry cause the lighting management system to:
receive a map of a space designating a plurality of locations within the space; and
associate each one of the plurality of lighting fixtures with one of the plurality of locations based on the associated fixture location information.

20. The lighting management system of claim 19 wherein the memory stores further instructions, which, when executed by the processing circuitry cause the lighting management system to instruct a display to provide a user interface showing the map and a visual representation of the stored sensor data, wherein the stored sensor data for each one of the plurality of lighting fixtures is presented in the one of the plurality of locations associated with the particular lighting fixture.

21. The lighting management system of claim 20 wherein:
the stored sensor data comprises occupancy sensor data indicating occupancy events detected by each one of the plurality of lighting fixtures; and
the visual representation of the stored sensor data is a color indicative of the frequency of occupancy events within a period of time.

22. The lighting management system of claim 20 wherein:
the stored sensor data comprises imaging sensor data showing images of the environment surrounding each one of the plurality of lighting fixtures; and
the visual representation comprises the images.

23. The lighting management system of claim 20 wherein:
the stored sensor data comprises energy consumption data indicating the energy consumption of each one of the plurality of lighting fixtures; and
the visual representation of the stored sensor data is a color indicative of the energy consumption within a period of time.

24. The lighting management system of claim 18 wherein:
the plurality of lighting fixtures are distributed throughout a retail space;
the stored sensor data includes occupancy sensor data indicating occupancy events detected by each one of the plurality of lighting fixtures; and
the memory stores instructions, which, when executed by the processing circuitry cause the lighting management system to analyze the stored sensor data to determine which areas of the retail space receive the highest amount of traffic.

25. The lighting management system of claim 24 wherein the memory stores further instructions, which, when executed by the processing circuitry cause the lighting management system to provide a user interface showing a visual representation of the amount of traffic over a period of time in the retail space.

* * * * *